United States Patent [19]

Murray

[11] Patent Number: 5,794,727

[45] Date of Patent: Aug. 18, 1998

[54] EARTH REMEDIATION AUGER

[76] Inventor: Richard P. Murray. 608 W. San Marcos Dr., Chandler, Ariz. 85224

[21] Appl. No.: 740,265

[22] Filed: Oct. 25, 1996

[51] Int. Cl.⁶ ..................... E21B 10/44
[52] U.S. Cl. ............ 175/394; 175/313; 299/87.1
[58] Field of Search ............... 175/385, 335, 175/394, 386, 401; 299/87.1, 89

[56] References Cited

U.S. PATENT DOCUMENTS

| | | | |
|---|---|---|---|
| 2,650,083 | 8/1953 | Robbins | 175/394 X |
| 2,751,203 | 6/1956 | Compton | 175/394 X |
| 3,388,949 | 6/1968 | Kozar | 175/394 X |
| 3,763,942 | 10/1973 | Levitt | 175/394 X |
| 4,022,286 | 5/1977 | Gill | 175/394 X |
| 4,917,196 | 4/1990 | Stiffler et al. | 175/385 |
| 5,158,147 | 10/1992 | Pavey et al. | 175/385 |

*Primary Examiner*—Frank Tsay
*Attorney, Agent, or Firm*—Meschkow & Gresham, P. L. C.; Jordan M. Meschkow; Lowell W. Gresham

[57] ABSTRACT

An earth remediation auger (22) is adapted for boring into tight ground (28) at a contaminated site. The earth remediation auger (22) includes a soil mixer (36) with mixing holes (40), scraping blades (34), and fin cutters (32). The fin cutters (32) score the ground (28) before the scraping blades (34) break the scored ground (28) into chunks and pass the chunks onto the soil mixer (36). The earth remediation auger (22) has relief cutouts (50) for self-cleaning of clay based soils.

17 Claims, 3 Drawing Sheets

5,794,727

1

EARTH REMEDIATION AUGER

TECHNICAL FIELD OF THE INVENTION

This invention relates to the field of hazardous waste removal. More specifically, the present invention relates to the treatment and removal of hazardous waste in tight ground using an improved earth remediation auger.

BACKGROUND OF THE INVENTION

The treatment of contaminated soils is a technology that is growing since the passing of the "Superfund" law in 1980. Amendments to this law in 1986 make clean up even more restrictive. Developing and perfecting treatment is an on-going process.

One method of treatment currently used is a physical process to permanently alter or remove hazardous waste material from ground sites. During this method, drilling takes place to a depth needed to reach the toxic waste. The next step is the treating and mixing of the soil. Various methods of treatments can be used. For instance, the mixed soil may be chemically treated or biologically injected to remove the toxins.

A major problem with this method is the inefficient mixing of tight ground. Tight ground is any ground that is clay in basis, hard packed sand, or soft rock material, such as shale. The prior art permits digging of tight ground but it does not permit adequate mixing. The problem arises from the inability of current technology to sufficiently break the tight ground for mixing.

The inefficient mixing leads to other problems. The contaminated soil may not be cleaned efficiently. Hence, the cleaning is not cost effective. Toxins may remain that continue to create environmental concerns.

Another problem of conventional remediation equipment is the inability to adequately break the tight ground for detoxification. Adequate breaking is needed to effectively treat the tight ground.

Conventional remediation equipment has the additional problem of augers becoming clogged when used in clay based soils. There is not a self-cleaning process that will allow the auger to remain unclogged. Clogging leads to excessive cost of operating and poor results as well as slower results.

SUMMARY OF THE INVENTION

Accordingly, it is an advantage of the present invention that an improved earth remediation auger which mixes hazardous waste is provided.

Another advantage is that an earth remediation auger which better breaks up tight ground is provided.

Another advantage of the present invention is that there is provided a self-cleaning action of an auger when used in clay based soils.

The above and other advantages of the present invention are carried out in one form by an earth remediation auger configured to bore into and mix tight ground. The earth remediation auger has a scraping blade configured to circumferentially scrape the soil and a fin cutter configured to vertically score the soil. Both the scraping blade and the fin cutter are attached to a nose flight.

The above and other advantages of the present invention are carried out in another form by an earth remediation auger configured to bore into and mix tight ground. The earth remediation auger includes a soil mixer with mixing holes and scraping blades.

2

The above and other advantages of the present invention are carried out in another form by an earth remediation auger configured to bore into and mix tight ground. The earth remediation auger includes a soil mixer having side cutters and relief cutouts. The side cutters attach to an outer rim of the soil mixer.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
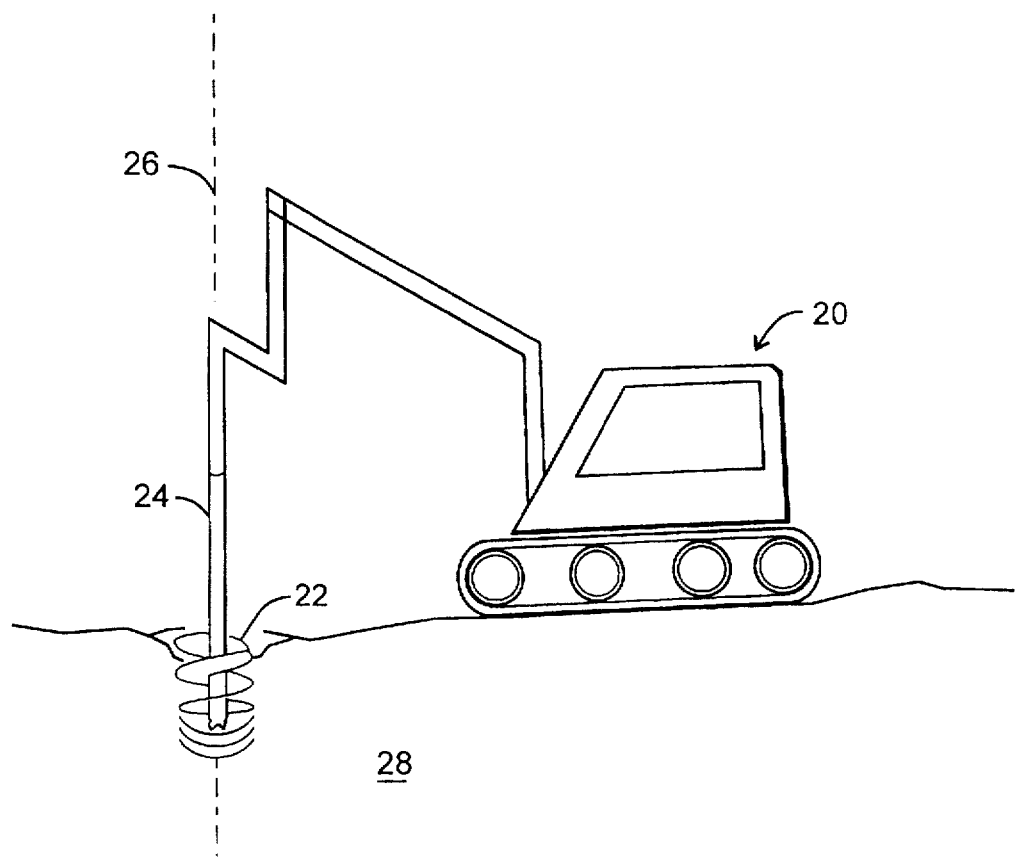
FIG. 1 shows an earth remediation apparatus.

FIG. 1 depicts an earth remediation apparatus 20 in operation. An auger 22 rotates on a shaft 24 about an axis 26 for the purpose of boring into ground sites. Often times tight ground 28 is encountered at the site. In some cases a dual auger 22 arrangement (not shown) is utilized. Apparatus 20 may be used on a hazardous waste site for the removal of toxic contaminants. Except for auger 22, which is discussed below in detail, a conventional earth remediation apparatus 20 is used in connection with the preferred embodiments of the present invention.

Figure 2:
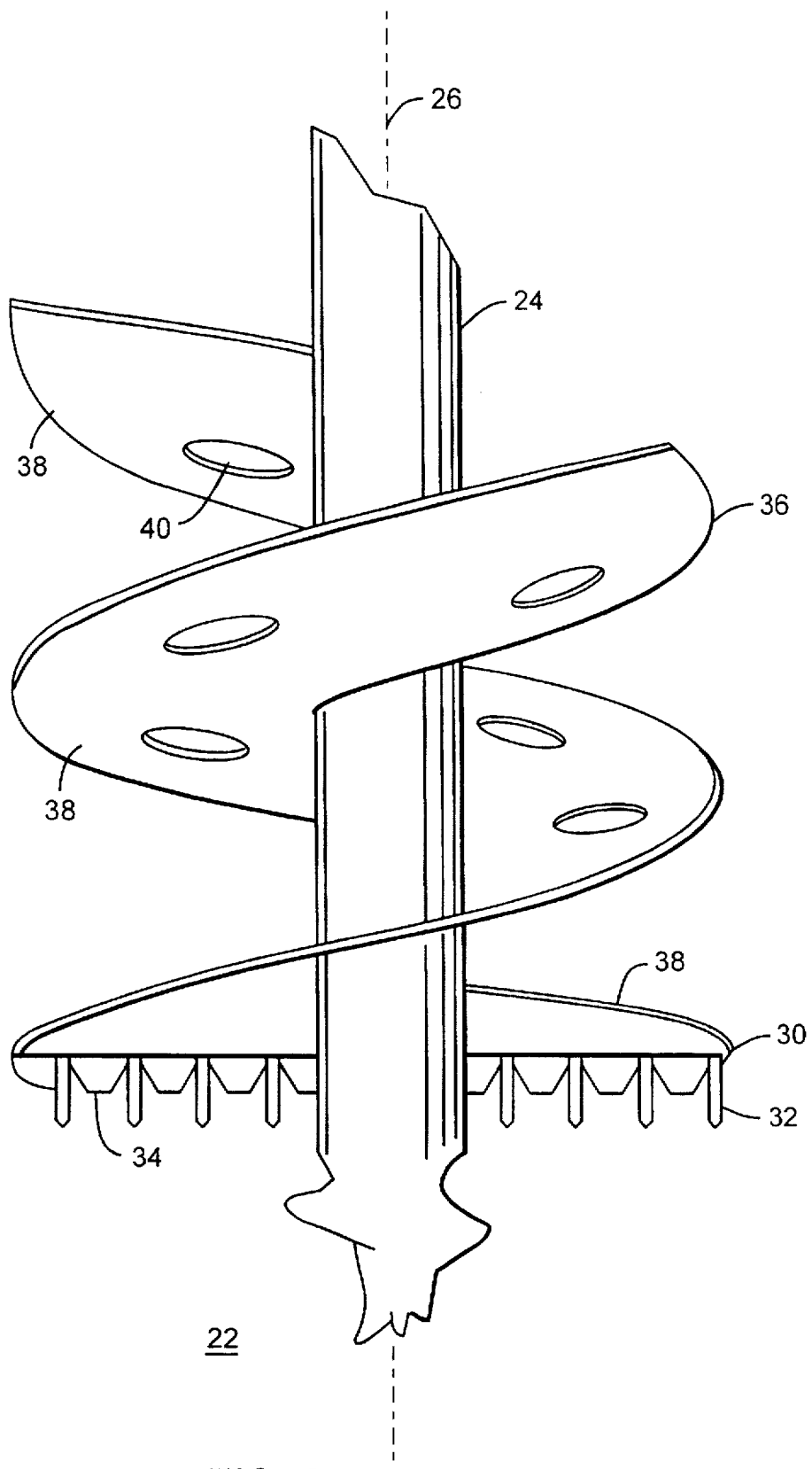
FIG. 2 shows a detailed side view of an auger.

FIG. 2 shows a detailed side view of auger 22. Auger 22 has a nose flight 30 located at the bottom edge of auger 22 when boring in a vertical direction. A plurality of fin cutters 32 reside on nose flight 30. Fin cutters 32 are attached, for example, by being welded to nose flight 30. Fin cutters 32 are designed to make the primary or first cut during the boring operation. Fin cutters 32 score tight ground 28 (see FIG. 1) in a substantially parallel direction to axis 26, thus, completing a vertical cut. Fin cutters 32 score tight ground 28 in concentric circles as auger 22 meets tight ground 28.

Auger 22 additionally has scraping blades 34. Scraping blades 34 cut in a substantially perpendicular direction to axis 26. Thus, scraping blades 34 make a generally horizontal circular cut as auger 22 bores vertically into tight ground 28. Fin cutters 32 are substantially perpendicular to scraping blades 34. Fin cutters 32 first score ground 28, then scraping blades 34 break the scored ground 28 into chunks and pass the chunks up to a soil mixer 36 for mixing.

Soil mixer 36 is positioned along the length of shaft 24. Soil mixer 36 includes a plurality of flights 38, as seen in FIG. 2. Flights 38 include nose flight 30. Flights 38 contain a plurality of mixing holes 40. However, mixing holes 40 may be omitted from nose flight 30. Mixing holes 40 extend through soil mixer 36 in a direction substantially parallel to axis 26. Mixing holes 40 are of a size to allow for the passing and mixing of chunks of tight ground 28. Mixing holes 40 have an arrangement that permits them to be axially unaligned. This unalignment contributes to the mixing process. It creates a churning movement as the chunks search for the next mixing hole 40 to past through.

Fin cutters 32 are spaced approximately 4" to 6" apart in the preferred embodiment. This spacing of fin cutters 32 defines the size of chunks that pass up flights 38 of mixer 36 for mixing. Mixing holes 40 have an average diameter that is large enough to allow the chunks to pass through mixing holes 40. In other words, the average diameters of mixing holes 40 are larger than the spacing between fin cutters 32. The passing of chunks from one level to another enhances the mixing process over the degree of mixing achievable without mixing holes 40.

Figure 3:
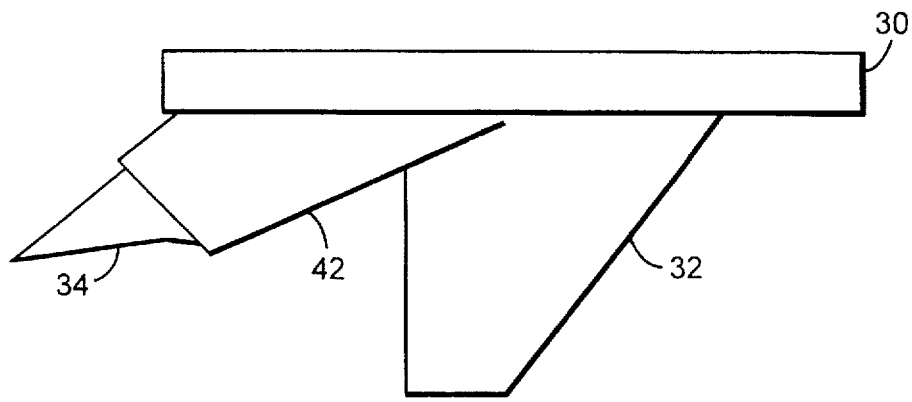
FIG. 3 shows a side view of a cutting tooth and a fin cutter.
Figure 4:
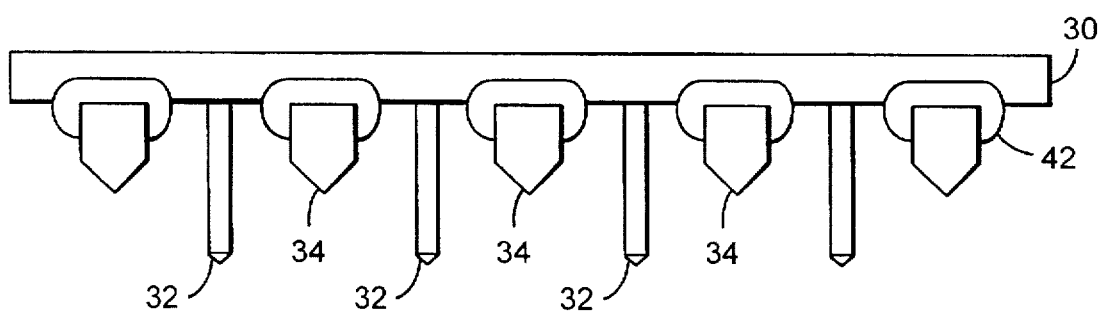
FIG. 4 shows a front view of a plurality of cutting teeth interleaved with fin cutters.

FIG. 3 shows a side view of scraping blade 34 and fin cutter 32, while FIG. 4 shows a front view of how scraping blades 34 are radially interleaved with fin cutters 32. As seen in FIG. 3, scraping blades 34 are positioned forward of fin cutter 32 relative to the direction of rotation of auger 22 and are contained in mounting racks 42. This design allows for both fin cutters 32 and scraping blades 34 each to perform without interfering with the operation of the other.

Figure 5:
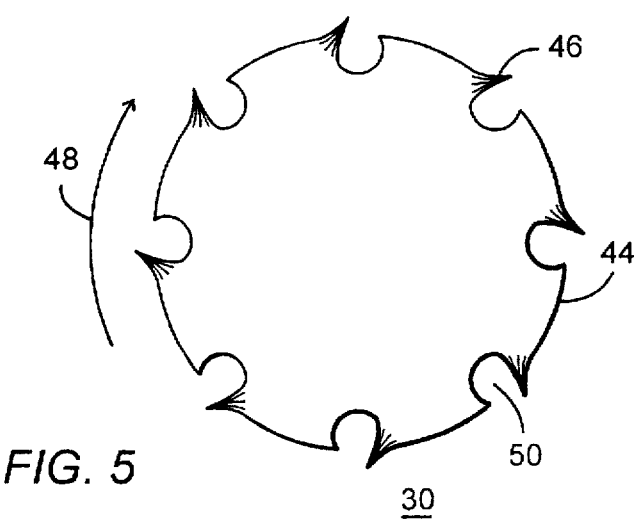
FIG. 5 shows a top view of side cutters and relief cutouts.

FIG. 5 shows a top view of nose flight 30. Nose flight 30 has an outer rim 44. A plurality of side cutters 46 are housed in outer rim 44. Side cutters 46 may be welded or have a mounting bracket. Side cutters 46 project beyond outer rim 44 and are angled into the direction of rotation as indicated by an arrow 48 in FIG. 5. Relief cutouts 50 are also cut into outer rim 44. Each side cutter 46 has a corresponding relief cutout 50. Relief cutouts 50 are adjacent to side cutters 46 and precede side cutters 46 in direction 48 of rotation for auger 22. Relief cutouts 50 provide a sloughing area for tight ground 28. This sloughing area permits the tight ground 28 to escape side cutters 46 instead of clogging side cutters 46.

In summary, the present invention provides an improved earth remediation auger 22 for mixing tight ground 28. In the preferred embodiment, earth remediation auger 22 provides a more complete breaking up of the tight ground 28 through fin cutters 32, provides mixing holes 40 to facilitate mixing, and provides relief cutouts 50 to create a self-cleaning earth remediation auger 22.

Although the preferred embodiments of the invention have been illustrated and described in detail, it will be readily apparent to those skilled in the art that various modifications may be made therein without departing from the spirit of the invention or from the scope of the appended claims. Moreover, those skilled in the art will appreciate that auger 22 need not bore exclusively into tight ground but may be used to advantage in a wide variety of soils. In addition, auger 22 may be used in a variety of orientations and need not bore only vertically.

What is claimed is:

1. In an earth remediation apparatus configured to bore into and mix tight ground, an earth remediation auger having an axis, said earth remediation auger comprising:
    a scraping blade attached to a nose flight and configured to circumferentially scrape soil in a direction substantially perpendicular to said axis; and
    a fin cutter attached to said nose flight and configured to score soil in a direction substantially parallel to said axis.

2. An earth remediation auger as claimed in claim 1 wherein:
    said scraping blade is one of a plurality of scraping blades configured to circumferentially scrape soil in said direction substantially perpendicular to said axis;
    said fin cutter is one of a plurality of fin cutters configured to score in said direction substantially parallel to said axis; and
    said fin cutters are interleaved with said scraping blades.

3. An earth remediation auger as claimed in claim 1 wherein:
    said scraping blade extends in a first direction, said fin cutter extends in a second direction, and said first and second directions being substantially perpendicular to one another.

4. An earth remediation auger as claimed in claim 1 wherein:
    said nose flight has a side cutter positioned adjacent to a relief cutout.

5. An earth remediation auger as claimed in claim 1 wherein:
    said earth remediation auger additionally comprises a plurality of side cutters projecting outward from said nose flight; and
    a plurality of relief cutouts in said nose flight, said cutouts being positioned adjacent to said plurality of side cutters, respectively.

6. In an earth remediation apparatus configured to bore into and mix tight ground, an earth remediation auger comprising:
    a soil mixer having at least one flight with a mixing hole therein; and
    a scraping blade attached to said soil mixer.

7. An earth remediation auger as claimed in claim 6 wherein:
    said mixing hole is unobstructed.

8. An earth remediation auger as claimed in claim 7 wherein:
    said earth remediation auger rotates about an axis; and
    said mixing hole extend through said soil mixer in a direction substantially parallel to said axis.

9. An earth remediation auger as claimed in claim 6 wherein:
    said soil mixer has a plurality of flights;
    a plurality of mixing holes; and
    said mixing holes are positioned on more than one of said flights.

10. An earth remediation auger as claimed in claim in 9 wherein:
    said soil mixer has a nose flight; and
    said soil mixer has a plurality of fin cutters on said nose flight configured to circumferentially score the earth.

11. An earth remediation auger as claimed in claim 10 wherein:
    said mixing holes have an average diameter; and
    said plurality of fin cutters are spaced apart from one another a distance which is less than said diameter.

12. An earth remediation auger as claimed in claim 6 wherein:
    said soil mixer additionally has relief cutouts located in an outer rim thereof.

13. In an earth remediation auger configured to bore into and mix tight ground, an earth remediation auger comprising:
    a soil mixer having an outer rim;
    a side cutter attached at said outer rim of said soil mixer; and
    wherein said soil mixer has a relief cutout positioned adjacent to said side cutter and said soil mixer has a plurality of mixing holes.

14. In an earth remediation auger configured to bore into and mix tight ground, an earth remediation auger comprising: a soil mixer having an outer rim;
    a side cutter attached at said outer rim of said soil mixer;

wherein said soil mixer has a relief cutout positioned adjacent to said side cutter;

said auger is configured to rotate in a direction;

said side cutter projects outward and in said direction from said soil mixer; and said relief cutout is positioned adjacent to said side cutter in said direction.

15. In an earth remediation auger configured to bore into and mix tight ground, an earth remediation auger comprising: a soil mixer having an outer rim;

a side cutter attached at said outer rim of said soil mixer;

wherein said soil mixer has a relief cutout positioned adjacent to said side cutter, said earth remediation auger additionally comprises a plurality of side cutters attached to said outer rim of said soil mixer; and a plurality of relief cutouts are positioned adjacent to said plurality of side cutters, respectively.

16. An earth remediation auger as claimed in claim 15 wherein:

said earth remediation auger has a fin cutter attached to said soil mixer; and said earth remediation auger has a scraping blade attached to said soil mixer.

17. An earth remediation auger as claimed in claim 16 wherein:

said scraping blade is one of a plurality of scraping blades configured to circumferentially scrape earth in a direction substantially perpendicular to an axis of said auger;

said fin cutter is one of a plurality of fin cutters configured to score in said direction substantially parallel to said axis; and said fin cutters are interleaved with said scraping blades.

* * * * *